(12) United States Patent
Nagda et al.

(10) Patent No.: US 10,122,270 B2
(45) Date of Patent: Nov. 6, 2018

(54) TUNABLE VOLTAGE REGULATOR CIRCUIT

(71) Applicant: NXP USA, INC., Austin, TX (US)

(72) Inventors: Miten Nagda, Austin, TX (US); Dale McQuirk, Austin, TX (US); Andre L. Vilas Boas, Amparo (BR); Richard Saez, Campinas (BR)

(73) Assignee: NXP USA, Inc., Austin, TX (US)

( * ) Notice: Subject to any disclaimer, the term of this patent is extended or adjusted under 35 U.S.C. 154(b) by 17 days.

(21) Appl. No.: 15/491,359

(22) Filed: Apr. 19, 2017

(65) Prior Publication Data

US 2018/0026531 A1  Jan. 25, 2018

(30) Foreign Application Priority Data

Jul. 19, 2016  (EP) .................................... 16180108

(51) Int. Cl.
*H02M 3/156* (2006.01)
*H02M 1/08* (2006.01)
*H02M 1/00* (2006.01)

(52) U.S. Cl.
CPC ............. *H02M 3/156* (2013.01); *H02M 1/08* (2013.01); *H02M 2001/0003* (2013.01)

(58) Field of Classification Search
CPC . H02M 1/08; H02M 2001/0003; H02M 3/156
USPC ................. 327/108, 109, 111, 306, 331, 332
See application file for complete search history.

(56) References Cited

U.S. PATENT DOCUMENTS

| | | | |
|---|---|---|---|
| 6,861,827 B1* | 3/2005 | Yang | G05F 3/262 323/273 |
| 7,208,919 B2 | 4/2007 | May | |
| 7,274,176 B2* | 9/2007 | Mihara | G05F 1/575 323/269 |
| 7,372,382 B2 | 5/2008 | Hazucha et al. | |
| 7,501,718 B2 | 3/2009 | Baglin et al. | |
| 2007/0018623 A1* | 1/2007 | Lopata | G05F 1/575 323/282 |
| 2007/0063686 A1 | 3/2007 | Yamada | |
| 2010/0060083 A1 | 3/2010 | Rolland | |
| 2013/0193939 A1 | 8/2013 | Sakaguchi et al. | |
| 2013/0250631 A1* | 9/2013 | Liao | H02M 1/126 363/44 |

(Continued)

FOREIGN PATENT DOCUMENTS

CN  102375465 A  3/2012
EP  1806639 A1  7/2007

*Primary Examiner* — William Hernandez (57) ABSTRACT

A voltage regulator has an output driver current mirror circuit and one or more control circuits. The output driver current mirror circuit includes an output driver transistor, a tunable resistance circuit, and a diode-connected transistor. The output driver transistor has one current electrode coupled to a supply voltage and another current electrode coupled to an output terminal for providing the output voltage of the voltage regulator. The tunable resistance circuit has one terminal coupled to a control electrode of the output driver transistor, and another terminal coupled to a current electrode of the diode-connected transistor. The one or more control circuits includes a comparator for controlling a current provided to the output driver current mirror in response to a feedback signal from the output terminal.

20 Claims, 4 Drawing Sheets

(56) References Cited

U.S. PATENT DOCUMENTS

| | | | |
|---|---|---|---|
| 2014/0117958 A1* | 5/2014 | Price | G05F 1/575 323/281 |
| 2014/0191739 A1 | 7/2014 | Kim et al. | |
| 2015/0263618 A1* | 9/2015 | Chern | G05F 1/575 323/271 |

* cited by examiner

TUNABLE VOLTAGE REGULATOR CIRCUIT

CROSS-REFERENCE TO RELATED APPLICATIONS

This application claims the priority under 35 U.S.C. § 119 of European Patent application no. 16180108.9, filed on Jul. 19, 2016, the contents of which are incorporated by reference herein.

FIELD

This disclosure relates generally to voltage regulation and more specifically to a tunable voltage regulator circuit.

RELATED ART

There are several different types of voltage regulators. A switched-current voltage regulator (also known as a hysteretic regulator) provides a DC (direct current) output voltage that is not constant, but may ripple because a switching current is charging and discharging a capacitor coupled to the output. In applications that can tolerate some ripple, a switched-current voltage regulator that works in this manner may be suitable. However, it can be difficult to provide a switched-current voltage regulator that is stable over a wide load range. Typically, the capacitor coupled to the output is designed to be relatively large to insure stability and minimize ripple with a changing load current. Also, it may be desirable to provide a switched-current voltage regulator that can be used in different applications with different requirements while having a relatively wide load range and different load capacitor size requirements. Therefore, a need exists for a switched-current voltage regulator that is easily adaptable to changing requirements for ripple voltage, di/dt minimization, and load capacitor size requirements.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

Generally, there is provided, a hysteretic, or switched-current, voltage regulator having an output driver current mirror circuit with a tunable resistance, and one or more control circuits. The output driver current mirror circuit also includes an output driver transistor and a diode-connected transistor. The output driver transistor has one current electrode coupled to a supply voltage and another current electrode coupled to an output terminal. The tunable resistance circuit has one terminal coupled to a control electrode of the output driver transistor, and another terminal coupled to a current electrode of the diode-connected transistor. The one or more control circuits includes a comparator for controlling a current provided to the output driver current mirror in response to a feedback signal from the output terminal. The tunable resistance and the feedback signal together provide hysteresis for current switching.

The voltage regulator uses an RC time constant provided by a tunable resistance circuit, parasitic capacitance of an output driver transistor, and an output capacitor. The advantage of control provided by the RC time constant in this way is that the maximum frequency of output voltage VOUT can be set for a smoother di/dt slew rate at the expense of bandwidth and ripple or capacitor size. Also, the ability to tune the resistance in the output driver current mirror multiplication circuit allows the use of smaller capacitors on the output terminal of the voltage regulator at the expense of higher di/dt.

In one embodiment, there is provided, a voltage regulator comprising: an output terminal; an output driver current mirror circuit comprising an output driver transistor and a diode-connected transistor with a tunable resistance circuit coupled therebetween, the output driver transistor coupled to provide an output voltage to the output terminal; and a first control circuit comprising a first comparator, the first comparator for controlling a first current to the output driver current mirror circuit in response to a first feedback signal from the output terminal. The voltage regulator may further comprise a second control circuit comprising a second comparator, the second comparator for controlling a second current to the output driver current mirror circuit in response to a second feedback signal from the output terminal. The second control circuit may comprise a third comparator coupled to increase the second current to the output driver current mirror circuit in response to the a third feedback signal indicating that the output voltage at the output terminal is below a predetermined voltage level. The tunable resistance circuit may provide a variable resistance to a control electrode of the output driver transistor in response to a control signal, and wherein the variable resistance may provide di/dt control for the output voltage. The voltage regulator may be formed on an integrated circuit.

In another embodiment, there is provided, a voltage regulator comprising: an output driver transistor having a first current electrode coupled to a first power supply voltage terminal, a control electrode, and a second current electrode coupled to an output terminal; a tunable resistance having a first terminal coupled to the control terminal of the output driver transistor, a second terminal, and a control terminal for receiving a control signal; a first transistor having a first current electrode coupled to the first power supply voltage terminal, a control electrode, and a second current electrode coupled to the second terminal of the tunable resistance; a second transistor having a first current electrode coupled to the second current electrode of the first transistor, a control electrode, and a second current electrode; and a first comparator having a first input for receiving a first reference voltage, a second input coupled to the output terminal for receiving a first feedback signal, and an output coupled to the control electrode of the second transistor. The voltage regulator may further comprise a tunable current source having a first terminal coupled to the second current electrode of the second transistor, a control terminal, and a second terminal coupled to a second power supply voltage terminal. The voltage regulator may further comprise: a second comparator having a first input for receiving the first reference voltage, a second input coupled to the output terminal for receiving a second feedback signal, and an output; a first current source having a first terminal coupled to the first power supply voltage terminal, and a second terminal; a third transistor having a first current electrode coupled to the second terminal of the first current source, a control terminal coupled to the output of the second comparator, and a second current electrode; and a fourth transistor having a first current electrode coupled to the second current electrode of the third transistor, a control electrode coupled to the control terminal of the tunable current source, and a second current electrode coupled to the second power supply voltage terminal. The voltage regulator may further comprise: a fifth transistor having a first current electrode coupled to the second terminal of the tunable resistance circuit, a control electrode, and a second current electrode; a third comparator having a first input for receiving a second reference voltage, a second input coupled to the output terminal for receiving a third feedback signal, and an output; and a second current source having a first terminal coupled to the second current electrode of the fifth transistor, and a second terminal coupled to a second power supply voltage terminal. The second current source may be switchable between a high impedance state and a low impedance state. The voltage regulator may be implemented on a single integrated circuit. The voltage regulator may be characterized as being a switched-current voltage regulator. The voltage regulator may not receive a clock signal.

In yet another embodiment, there is provided, a voltage regulator comprising: an output driver current mirror circuit comprising: an output driver transistor having a first current electrode coupled to a first power supply voltage terminal, a control electrode, and a second current electrode coupled to an output terminal; a tunable resistance circuit having a first terminal, a control terminal, and a second current coupled to the control electrode of the output driver transistor; and a first transistor having a first current electrode coupled to the first power supply voltage terminal, a control electrode and a second current electrode both coupled to the first terminal of the tunable resistance circuit; a high power control circuit coupled to the first terminal of the tunable resistance circuit for providing a first current to the output driver current mirror circuit in a first operating mode; and a low power control circuit coupled to the first terminal of the tunable resistance circuit for providing a second current to the output driver current mirror circuit in a second operating mode, the second current being smaller than the first current. The high power control circuit may comprise: a second transistor having a first current electrode coupled to the first terminal of the tunable resistance circuit, a control electrode, and a second current electrode; a first comparator having a first input for receiving a first reference voltage, a second input for receiving a first feedback signal from the output driver current mirror circuit, and an output coupled to the control electrode of the second transistor; a tunable current source having a first terminal coupled to the second current electrode of the second transistor, a control terminal, and a second terminal coupled to a second power supply voltage terminal. The high power control circuit may further comprise: a first current source having a first terminal coupled to the first power supply voltage terminal, and a second terminal; a third transistor having a first current electrode coupled to the second terminal of the first current source, a control electrode, and a second current electrode; a second comparator having a first input for receiving the first reference voltage, a second input for receiving a second feedback signal, and an output coupled to the control electrode of the third transistor; and a fourth transistor having a first current electrode and a control electrode both coupled to the second current electrode of the third transistor and to the control terminal of the tunable current source, and a second current electrode coupled the second power supply voltage terminal. The low power control circuit may comprise: a third transistor having a first current electrode coupled to the first terminal of the tunable resistance circuit, a control electrode, and a second current electrode; a third comparator having a first input for receiving a reference voltage, a second input for receiving a feedback signal from the output driver current mirror circuit, and an output coupled to the control electrode of the third transistor; and a current source having a first terminal coupled to the second current electrode of the third transistor, and a second terminal coupled to a second power supply voltage terminal. The output driver transistor and the first transistor are characterized as being a P-channel metal-oxide semiconductor transistors. The voltage regulator may be implemented on a single integrated circuit and the output terminal may be for providing an output voltage of the voltage regulator to a circuit external to the integrated circuit. The tunable resistance circuit may provide a variable resistance in response to a resistance control signal, wherein the tunable resistance circuit may provide di/dt control of an output voltage at the output terminal.

Figure 1:
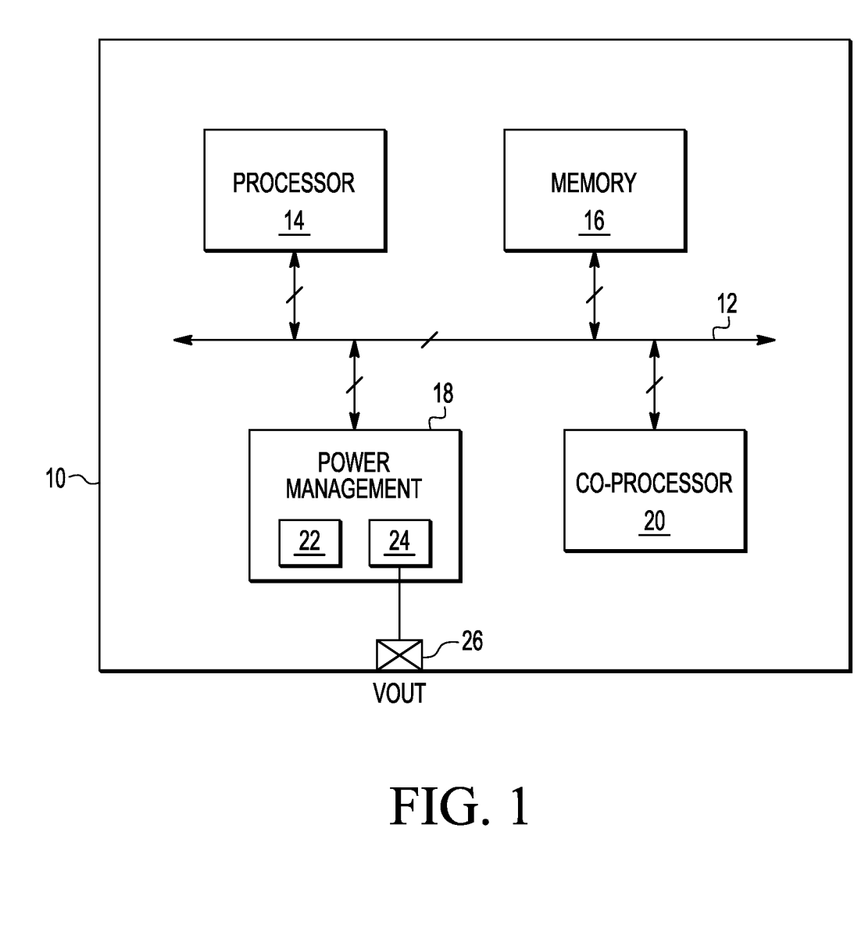
FIG. 1 illustrates a simplified block diagram of an integrated circuit data processing system in accordance with an embodiment.

FIG. 1 illustrates, a simplified block diagram of integrated circuit data processing system 10 in accordance with an embodiment. Data processing system 10 may be a system-on-a-chip (SoC) implemented on a single integrated circuit. In other embodiments, integrated circuit 10 may include another type of circuit such as an ASIC (application specific integrated circuit), stand-alone memory, FPGA (field programmable gate array), or the like. In one embodiment, data processing system 10 may include metal-oxide semiconductor (MOS) transistors fabricated using a conventional complementary metal-oxide semiconductor (CMOS) process. In another embodiment, data processing system 10 may include other transistor types, such as bipolar transistors, and may be manufactured with a different process.

Data processing system 10 includes communication bus 12, processor 14, memory 16, power management unit 18, and co-processor 20. Bus 12 may be a conventional bus having a plurality of conductors for communicating address, data, and control information. In other embodiments, bus 12 may be an interconnect structure such as for example, a cross-bar switch or other form of interconnect system. Processor 14 is bi-directionally connected to bus 12. Processor 14 may include one or more of any type of processing element, a processor core, microprocessor, microcontroller, digital signal processor, and the like. There can be any number of processors. Memory 16 is bi-directionally connected to bus 12. Memory 16 can be one or more of any type of volatile or non-volatile memory. Examples of memory types include non-volatile memories such as flash, one-time programmable (OTP), EEPROM (electrically eraseable programmable read only memory), and the like. Volatile memory types include static random access memory (SRAM) and dynamic random access memory (DRAM). Memory 16 may be used for storing instructions and/or data. Coprocessor 20 is bi-directionally connected to bus 12 and can be one or more of any type of coprocessor depending on the application. For example, coprocessor 20 may be a coprocessor optimized for running encryption/decryption security software according to the Advanced Encryption Standard (AES) or other type of encryption. AES may be used to encrypt/decrypt data and instructions in data processing system 10. Other types of coprocessors may be provided for processing video, audio, error diagnostics, etc. Power management unit 18 includes control circuitry for controlling the distribution of power to the various blocks of integrated circuit 10 and is bi-directionally connected to bus 12. The control circuitry of power management unit 18 may determine, for example, which blocks of integrated circuit 10, or portions of blocks, receive power during various operating modes. A power supply bus, or grid (not shown), is typically provided over the integrated circuit to distribute one or more power supply voltages to the different circuits of the integrated circuit device. Power management unit 18 may include one or more voltage regulator circuits, such as for example, representative voltage regulator circuits 22 and 24. As illustrated, voltage regulator 24 includes an output connected to an output terminal 26 for providing a supply voltage to circuitry external to integrated circuit 10. Voltage regulator circuits 22 and 24 may be similar voltage regulator circuits or different. There may be more or less than two voltage regulator circuits. As illustrated and described below, voltage regulator circuit 24 is a switched-current type of voltage regulator circuit. Voltage regulator 24 may also be connected to another terminal, either directly or indirectly through power management unit 18, for receiving a supply voltage from an external source such as a battery.

Figure 2:
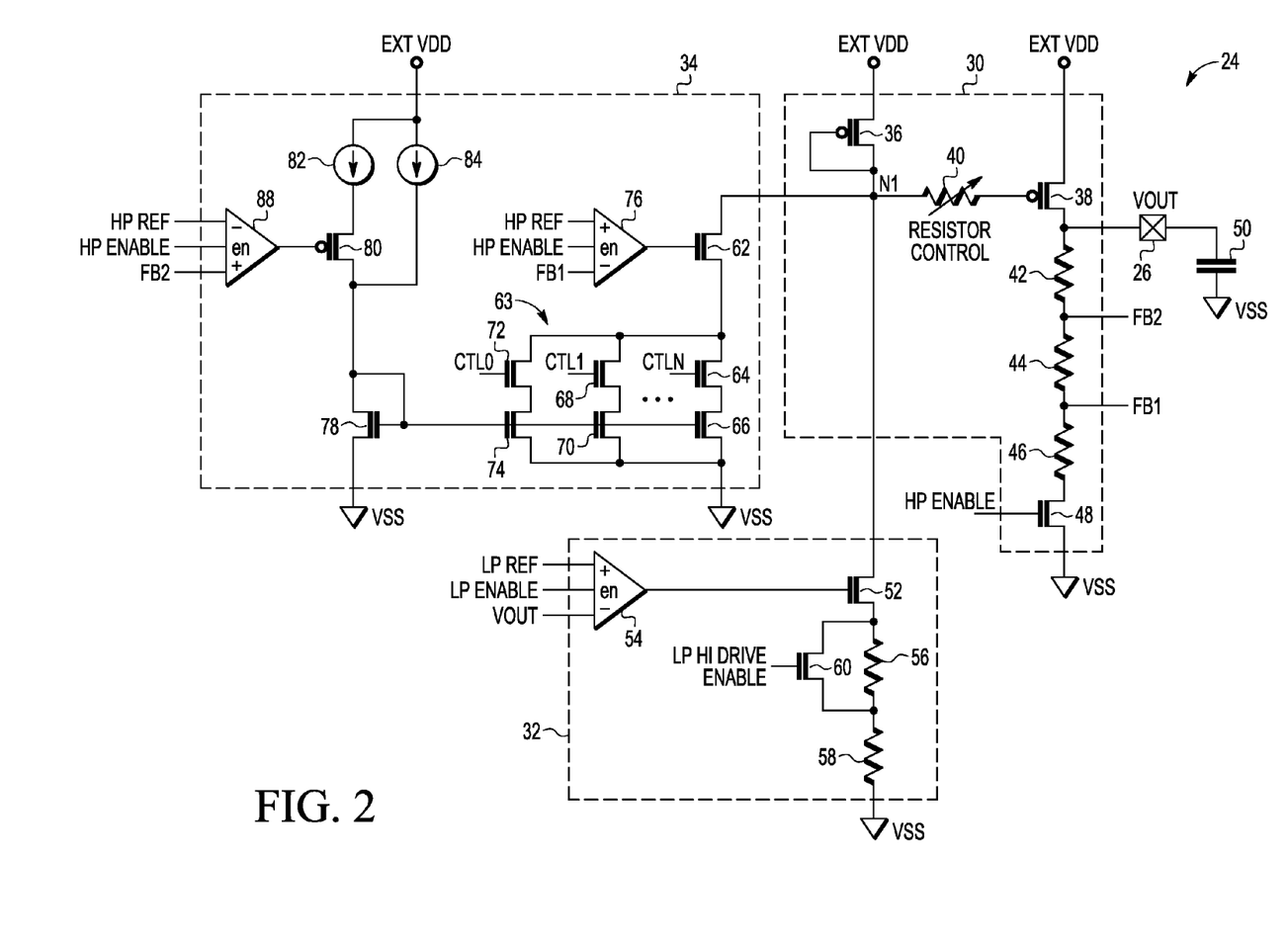
FIG. 2 illustrates, in schematic diagram form, a switched-current voltage regulator of the integrated circuit of FIG. 1.

FIG. 2 illustrates, in schematic diagram form, switched-current voltage regulator 24 of integrated circuit 10 of FIG. 1. Voltage regulator 24 includes output driver current mirror circuit 30, low power control circuit 32, and high power control circuit 34. Output driver current mirror circuit 30 includes P-channel transistors 36 and 38, tunable resistance circuit 40, resistors 42, 44, and 46, and N-channel transistor 48. Low power control circuit 32 includes N-channel transistors 52 and 60, comparator 54, and resistors 56 and 58. High power control circuit 34 includes N-channel transistors 62 and 78, tunable current source 63, P-channel transistor 80, comparators 76 and 88, and current sources 82 and 84. Tunable current source 63 includes N-channel transistors 64, 66, 68, 70, 72, and 74.

In output driver current mirror circuit 30, P-channel transistor 38 has a first current electrode (source) connected to a first power supply voltage terminal for receiving a supply voltage labeled "EXT VDD," a control electrode (gate), and a second current electrode (drain) connected to output terminal 26. Output terminal 26 may be connected to provide a supply voltage to circuits of integrated circuit 10, or to circuits external to integrated circuit 10, or both. P-channel transistor 36 has a first current electrode connected to receive EXT VDD, a control electrode and a second current electrode connected together at an internal node N1. Tunable resistance circuit 40 has a first terminal connected to node N1, a control terminal for receiving a control signal labeled "RESISTOR CONTROL," and a second terminal connected to the control electrode of P-channel transistor 38. P-channel transistor 38 functions as a driver transistor for providing the output voltage VOUT, and P-channel transistor 36 is diode-connected and functions as a diode. Together, P-channel transistors 36 and 38, and tunable resistance circuit 40 function as a current mirror. Resistor 42 has a first terminal connected to the second current electrode of P-channel transistor 38, and a second terminal for providing a feedback signal labeled "FB2." Resistor 44 has a first terminal connected to the second terminal of resistor 42, and a second terminal for providing a feedback signal labeled "FB1." Resistor 46 has a first terminal connected to the second terminal of resistor 44, and a second terminal. N-channel transistor 48 has a first current electrode connected to the second terminal of resistor 46, a control electrode for receiving a high power enable signal labeled "HP ENABLE," and a second current electrode connected to a second power supply voltage terminal labeled "VSS". In the illustrated embodiment, output driver current mirror circuit 30 is supplied by power supply voltage EXT VDD. In another embodiment, diode-connected transistor 36 may receive, for example, one power supply voltage and output driver transistor 38 may receive a different power supply voltage. Voltage regulator circuit 24 may also provide a DC-DC converter function (not shown). Also, in one embodiment, power supply voltage EXT VDD is a positive voltage provided by a battery, and VSS is at ground potential, or zero volts. In another embodiment, the power supply voltage may be different. Capacitor 50 has a first terminal connected to output terminal 26, and a second terminal connected to VSS.

In low power control circuit 32, N-channel transistor 52 has a first current electrode connected to internal node N1, a control electrode, and a second current electrode. Comparator 54 has a first input terminal labeled with a plus (+) for receiving a low power reference voltage labeled "LP REF," a second input terminal for receiving a low power enable signal labeled "LP ENABLE," a third input terminal labeled with a minus (−) for receiving output voltage VOUT as a feedback signal from output terminal 26, and an output terminal connected to the control electrode of N-channel transistor 52. Enable signal LP ENABLE may be asserted for operation in a low power mode. Resistor 56 has a first terminal connected to the second current electrode of N-channel transistor 52, and a second terminal. N-channel transistor 60 has a first current electrode connected to the first terminal of resistor 56, a control terminal for receiving a low power high drive enable signal labeled "LP HIDRIVE ENABLE," and a second current electrode connected to the second terminal of resistor 56. Resistor 58 has a first terminal connected to the second terminal of resistor 56, and a second terminal connected to second power supply voltage terminal VSS.

In high power control circuit, N-channel transistor 62 has a first current electrode connected to internal node N1, a control electrode, and a second current electrode. Tunable current source 63 has a first terminal connected to the second current electrode of N-channel transistor 62, a second terminal connected to second power supply voltage terminal VSS, and a plurality of control terminals for receiving a plurality of control signals labeled "CTL0-CTLN", where N is an integer. Each of the control signals CTL0-CTLN is provided to a gate of one of transistors 64, 68, and 72. Transistors 64, 68, and 72 function as switches for enabling current source transistors 66, 70, and 74. The amount of current provided by each of the current source transistors may be binary weighted with respect to the other of the current source transistors. Comparator 76 has a first input terminal labeled with a plus (+) for receiving a high power reference voltage labeled "HP REF," a second input terminal for receiving a high power enable signal labeled "HP ENABLE," a third input terminal labeled with a minus (−) for receiving a feedback signal labeled "FB1," and an output terminal connected to the control electrode of N-channel transistor 62. N-channel transistor 78 has a first current electrode and a control electrode connected together and to the control electrodes of N-channel transistors 66, 70, and 74, and a second current electrode connected to VSS. N-channel transistor 78 and N-channel transistors 66, 70, and 74 form a second current mirror. P-channel transistor 80 has a first current electrode, a control electrode, and a second current electrode connected to both the first current electrode and control electrode of N-channel transistor 78. Comparator 88 has a first input terminal labeled with a minus (−) for receiving high power reference voltage HP REF, a second input terminal for receiving high power enable signal HP ENABLE, a third input terminal labeled with a plus (+) for receiving a feedback signal labeled "FB2," and an output terminal connected to the control electrode of P-channel transistor 80. Current source 82 has a first terminal connected to the first power supply voltage terminal, and a second terminal connected to the first current electrode of P-channel transistor 80. Current source 84 has a first terminal connected to the first power supply voltage terminal, and a second terminal connected to the first current electrode of N-channel transistor 78.

Voltage regulator 24 is a linear regulator, generally categorized as being a type of linear hysteretic regulator, where a mirror current transition rate (di/dt), is not instantly seen at output terminal 26. The RC delay provided by a parasitic capacitance of driver transistor 38 and a resistance of tunable resistance circuit 40 slow the rate of change of the output current and smooth a crossover transition. Voltage regulator 24 switches a current up and down to control output voltage VOUT without the use of a clock signal. Generally, voltage regulator 24 receives supply voltage EXT VDD and provides a regulated voltage VOUT at output terminal 26. Supply voltage EXT VDD may be provided by, for example, a battery. Output terminal 26 may provide the voltage to circuitry of integrated circuit 10 or to circuitry external to integrated circuit 10, or both. Voltage regulator 24 has a low power mode and a high power mode. During low power mode, low power control circuit 32 is enabled to provide a current to internal node N1 of output driver current mirror circuit 30 and high power control circuit 32 is disabled. Low power mode may be used during, for example, a sleep, or standby mode of integrated circuit data processing system 10. During high power mode, high power control circuit 34 is enabled to provide a higher current to internal node N1 of output driver current mirror circuit 30 during a normal operating mode. Low power control circuit 32 and high power control circuit 34 are not enabled at the same time. Because voltage regulator 24 is configurable for different applications and changing conditions, various portions of voltage regulator 24 are configurable. For example, when the LP HIDRIVE ENABLE signal is asserted, N-channel transistor 60 is conductive causing a lower resistance path around resistor 56, thus allowing low power control circuit 32 to provide more current to node N1 because different applications may have different current requirements for low power mode. High power control circuit also has a provision for providing more current on demand by enabling an additional current source in response to output voltage VOUT decreasing below a predetermined voltage. In output driver current mirror circuit 30, the resistance provided by tunable resistance circuit 40 is adjusted in response to control signal RESISTOR CONTROL. In one embodiment, RESISTOR CONTROL is a three bit control signal for selecting binary weighted resistor segments of tunable resistance circuit 40 using analog multiplexers (not shown). In other embodiments, tunable resistance circuit 40 can be implemented differently. Tunable resistance circuit 40 allows the use of smaller external capacitors for capacitor 50 while still controlling di/dt slew rate of output signal VOUT. Because capacitor 50 can be smaller, the output driver transistor 38 can also be smaller, saving power and maximizing battery life in battery powered applications. Note that in the illustrated embodiment, the various enable and control signals of voltage regulator 24 are provided by control circuitry in power management unit 18.

More specifically, during operation of voltage regulator 24, output driver current mirror circuit 30 provides a relatively high gain from the current mirror to the output driver transistor 38. In one embodiment, the width/length ratio of driver transistor 38 to transistor 36 is 2000:1. When output voltage VOUT drops below a predetermined voltage level as determined by reference voltage LP REF, comparator 54 outputs a high signal to the control electrode of N-channel transistor 52, causing N-channel transistor 52 to be conductive, or at least more conductive, causing current to flow through resistor 56 and/or resistor 58, and thus pulling down the voltage at node N1. The drop in voltage at node N1 causes a magnified amount of current to be reflected, or mirrored, out of P-channel driver transistor 38, causing the output voltage VOUT to increase. The magnification in the current is equivalent to the ratio of sizes between transistor 38 and transistor 36. Comparators 54, 76, and 88 control the current provided to output driver current mirror circuit 30.

Low power control circuit 32 can provide more pull-down capability when LP HIDRIVE ENABLE signal is asserted, causing N-channel transistor 60 to be conductive and provide a less resistive current path around resistor 56. The lower resistance current path results in increased current through P-channel transistor 36 and a greater magnified/mirrored current through P-channel transistor 38 causing VOUT to increase faster. Assuming the low power enable signal LP ENABLE is still asserted, when the voltage of output voltage VOUT increases above reference voltage LP REF, comparator 54 outputs a low signal to the control electrode of N-channel transistor 52, causing N-channel transistor 52 to be less conductive. Current through P-channel transistor 36 is stopped, or at least reduced, which causes the voltage at node N1 to increase. Because of tunable resistance circuit 40 in current mirror output driver circuit 30, the voltage at the control electrode of output driver transistor 38 rises slowly compared to the voltage at node N1, which provides hysteresis to the circuit. After a delay, as controlled by tunable resistance circuit 40, a voltage at the control electrode of P-channel transistor 38 rises and stops current from flowing to output terminal 26. Thus, output voltage VOUT stops increasing, thereby regulating output voltage VOUT around a voltage determined by reference voltage LP REF.

In a high power mode, high power enable signal HP ENABLE is asserted and LP ENABLE is negated. Transistor 48 becomes conductive, and comparators 76 and 88 are enabled. The conductive N-channel transistor 48 causes feedback signals FB1 and FB2 to become active. When output voltage VOUT decreases, feedback signals FB2 and FB1 decreases by a proportionate amount depending on the values of resistances 42, 44, and 46. When output voltage VOUT drops below a predetermined voltage level, feedback signal FB1 drops below reference voltage HP REF, while feedback signal FB2 is still above HP REF, comparator 76 will output a high signal to the control electrode of N-channel transistor 62. N-channel transistor 62 will become more conductive. N-channel transistor 66 is biased by the circuit having N-channel transistor 78 and current source 84. At least one of the transistor pairs of tunable current source 63 will be conductive. The amount of current provided by current source 63 is adjustable by asserting different combinations of control signal CTL0-CTLN to accommodate different applications. The voltage at node N1 will be reduced. The reduced voltage at node N1 causes a mirror current through P-channel driver transistor 38 to be provided to output terminal 26, causing output voltage VOUT to increase. As discussed above, the mirror current through transistor 38 is a multiple of the current at node N1 because of the transistor size ratio between transistors 36 and 38.

However, if output voltage VOUT continues to decrease, because the load demand is high and feedback signal FB2 drops below reference voltage HP REF, comparator 88 will output a low voltage causing transistor 80 to be conductive. The current of current source 82 will be added to the current of current source 84. In one embodiment, the current of the combination of current sources 82 and 84 is about 3 times the current of current source 84 alone. In other embodiments, the current may be different. The additional current from current source 82 causes the gate of transistor 66 to receive a higher bias voltage and N-channel transistor 66 will become more conductive, thus pulling node N1 down harder and causing more current output of P-channel driver transistor 38 causing VOUT to rise faster.

Feedback signal FB2 will increase above high power reference voltage HP REF if output voltage VOUT continues to increase. Comparator 88 will output a high voltage thereby reducing the amount of current being mirrored by P-channel driver transistor 38, thus reducing the rate at which output voltage VOUT increases. If output voltage VOUT continues to increase, feedback FB1 will eventually rise above reference voltage HP REF and comparator 76 will output a low voltage. The low voltage from comparator 76 will reduce, or stop, current through P-channel transistor 36 and cause the voltage at node N1 to increase. Because of tunable resistance circuit 40, the rate of change of the voltage at the control electrode of output driver transistor 38 is less compared to the rate of change of the voltage at node N1, thus providing hysteresis. After a delay, as controlled by tunable resistance circuit 40, the voltage at the control electrode of P-channel transistor 38 will increase and stop current from flowing to output terminal 26. Thus, output voltage VOUT stops increasing, thereby regulating output voltage VOUT around a voltage determined by reference voltage HP REF.

Figure 3:
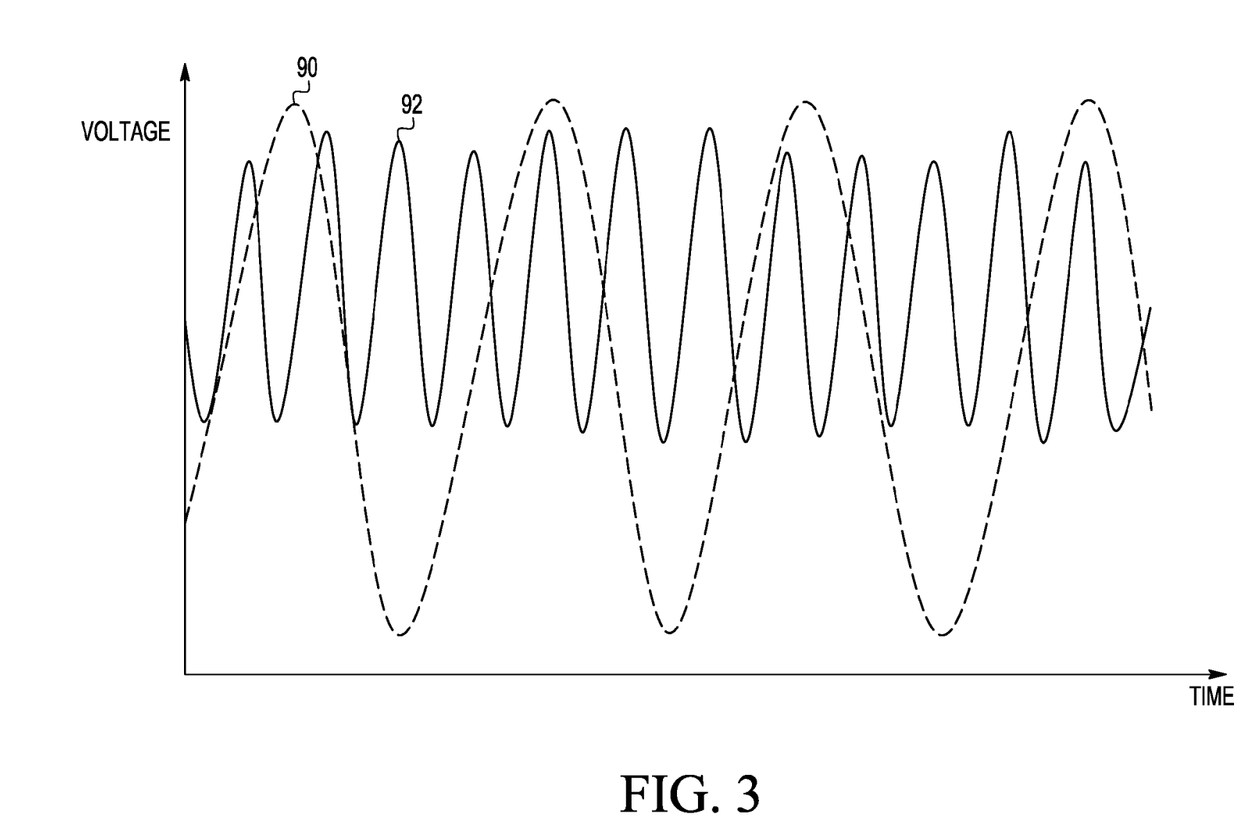
FIG. 3 illustrates a waveform of voltage vs. time for signal VOUT of the switched-current voltage regulator of FIG. 2.

FIG. 3 illustrates a waveform of voltage vs. time for output voltage VOUT of the voltage regulator 24 of FIG. 2 for two resistance values of tunable resistance circuit 40. For a low resistance value, the voltage variation of output signal VOUT will be higher as illustrated in FIG. 2. Waveform 90 represents output voltage VOUT for one resistance value and waveform 92 represents output voltage VOUT for a second higher resistance value. The voltage variation of waveform 92 is less than the voltage variation of waveform 90.

Figure 4:
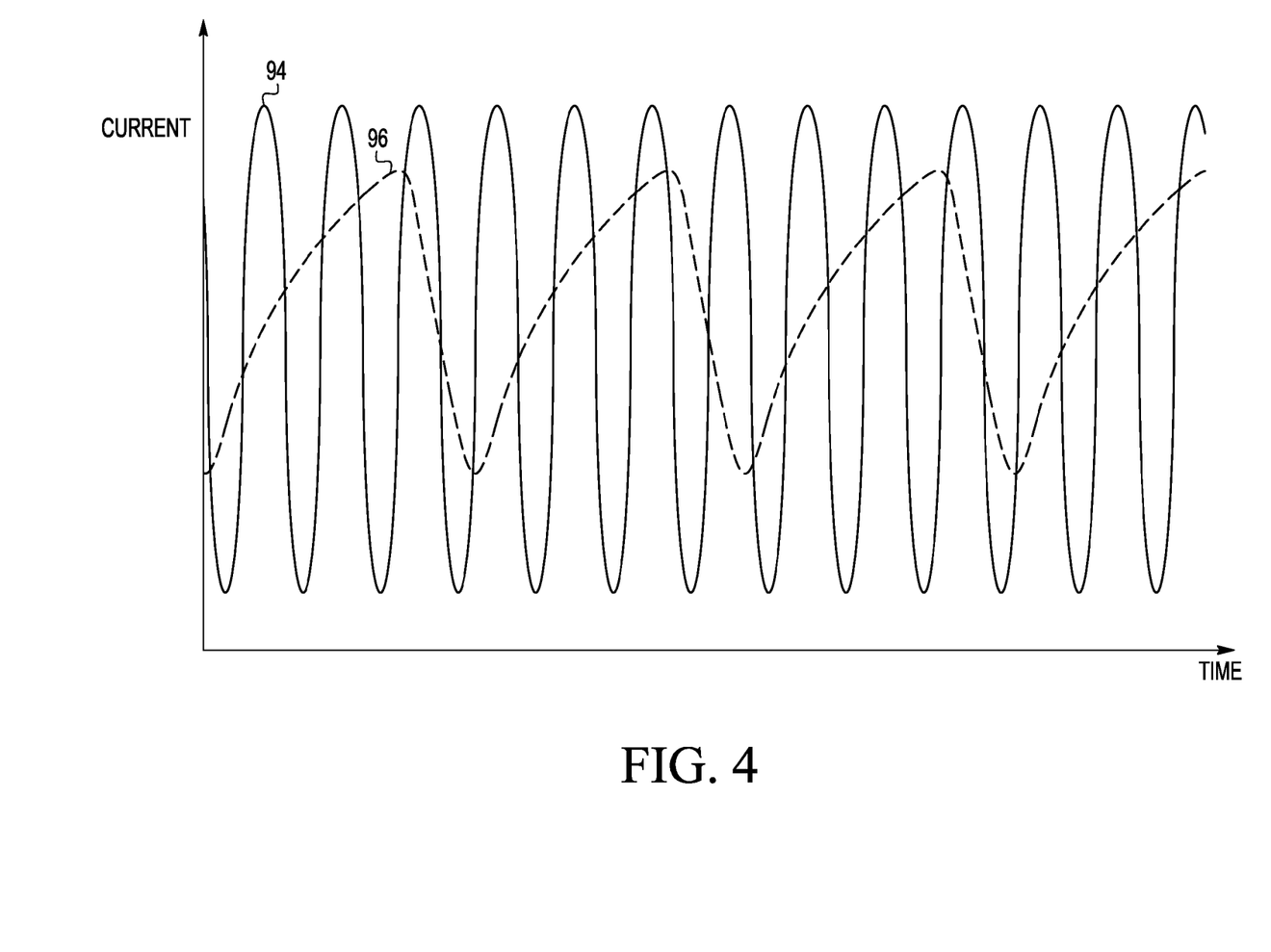
FIG. 4 illustrates a waveform of current vs. time for signal VOUT of the switched-current voltage regulator of FIG. 2.

FIG. 4 illustrates a waveform of current vs. time for output voltage VOUT of the voltage regulator 24 of FIG. 2 for two resistance values of tunable resistance circuit 40. Waveform 94 represents the current at output terminal 26 when the resistance of tunable resistance circuit 40 is a first lower resistance value. Waveform 96 represents the current of at output terminal 26 for a second higher resistance value of tunable resistance circuit 40. As can be seen in FIG. 4, the di/dt slew rate for output voltage VOUT of waveform 96 is lower than the di/dt slew rate of output voltage VOUT of waveform 94. The resistance of tunable resistance circuit 40 can be tunable for more than the two resistance values illustrated.

The switching operation of voltage regulator 24 is not clocked, so that the switching frequency is variable. For a given load, the tunable resistance and the feedback signal together provide AC hysteresis for current mirror switching. Also, the ability to tune the resistance in the output driver current mirror circuit allows the use of smaller capacitors on the output terminal of the voltage regulator. Also, the ability to tune voltage regulator 24 allows for use in various applications. Voltage regulator 24 uses an RC time constant of tunable resistance circuit 40 and output capacitor 50. The advantage of control provided by the RC time constant in this way is that the maximum current transition, ripple, and frequency of output voltage VOUT can be set for a smoother di/dt slew rate at the expense of bandwidth. By properly setting the RC time constant, voltage regulator 24 is sufficiently fast for voltage droop control and good power supply noise rejection. A quiescent current can be found to switch around much like a clocked regulator.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims. Generally, in the above described embodiment, a current electrode is a source or drain and a control electrode is a gate of a metal-oxide semiconductor (MOS) transistor. The transistors may also have a bulk, or substrate, terminal that is not shown in the drawings for the purposes of simplicity and clarity. Other transistor types may be used in other embodiments.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

The present disclosure extend to the following series of lettered clauses:

A A voltage regulator (24) comprising: an output driver transistor (38) having a first current electrode coupled to a first power supply voltage terminal, a control electrode, and a second current electrode coupled to an output terminal; a tunable resistance (40) having a first terminal coupled to the control terminal of the output driver transistor, a second terminal, and a control terminal for receiving a control signal; a first transistor (36) having a first current electrode coupled to the first power supply voltage terminal, a control electrode, and a second current electrode coupled to the second terminal of the tunable resistance; a second transistor (62) having a first current electrode coupled to the second current electrode of the first transistor, a control electrode, and a second current electrode; and a first comparator (76) having a first input for receiving a first reference voltage, a second input coupled to the output terminal for receiving a first feedback signal, and an output coupled to the control electrode of the second transistor.

A method of regulating a voltage by means of a voltage regulator comprising an output driver transistor, a tunable resistance, a first transistor (36), a second transistor (62) and a first comparator (76), the method comprising: receiving, by the first comparator a first reference voltage.

B. The voltage regulator of clause A, further comprising a tunable current source (63) having a first terminal coupled to the second current electrode of the second transistor, a control terminal, and a second terminal coupled to a second power supply voltage terminal.

C. The voltage regulator of clause B, further comprising: a second comparator (88) having a first input for receiving the first reference voltage, a second input coupled to the output terminal for receiving a second feedback signal, and an output; a first current source (82) having a first terminal coupled to the first power supply voltage terminal, and a second terminal; a third transistor (80) having a first current electrode coupled to the second terminal of the first current source, a control terminal coupled to the output of the second comparator, and a second current electrode; and a fourth transistor (78) having a first current electrode coupled to the second current electrode of the third transistor, a control electrode coupled to the control terminal of the tunable current source, and a second current electrode coupled to the second power supply voltage terminal.

D The voltage regulator of clause A, further comprising: a fifth transistor (52) having a first current electrode coupled to the second terminal of the tunable resistance circuit, a control electrode, and a second current electrode; a third comparator (54) having a first input for receiving a second reference voltage, a second input coupled to the output terminal for receiving a third feedback signal, and an output; and a second current source (56) having a first terminal coupled to the second current electrode of the fifth transistor, and a second terminal coupled to a second power supply voltage terminal.

E. The voltage regulator of clause D, wherein the second current source (56) is switchable between a high impedance state and a low impedance state.

F. The voltage regulator of clause A, wherein the voltage regulator is implemented on a single integrated circuit (10).

G. The voltage regulator of clause A, wherein the voltage regulator is characterized as being a switched-current voltage regulator.

H. The voltage regulator of clause G, wherein the voltage regulator does not receive a clock signal.

J. A voltage regulator (24) comprising: an output driver current mirror circuit (30) comprising: an output driver transistor (38) having a first current electrode coupled to a first power supply voltage terminal, a control electrode, and a second current electrode coupled to an output terminal (26); a tunable resistance circuit (40) having a first terminal, a control terminal, and a second current electrode coupled to the control electrode of the output driver transistor; and a first transistor (36) having a first current electrode coupled to the first power supply voltage terminal, a control electrode and a second current electrode both coupled to the first terminal of the tunable resistance circuit; a high power control circuit (34) coupled to the first terminal of the tunable resistance circuit for providing a first current to the output driver current mirror circuit in a first operating mode; and a low power control circuit (32) coupled to the first terminal of the tunable resistance circuit for providing a second current to the output driver current mirror circuit in a second operating mode, the second current being smaller than the first current.

K. The voltage regulator of clause J, wherein the high power control circuit (34) comprises: a second transistor (62) having a first current electrode coupled to the first terminal of the tunable resistance circuit, a control electrode, and a second current electrode; a first comparator (76) having a first input for receiving a first reference voltage, a second input for receiving a first feedback signal from the output driver current mirror circuit, and an output coupled to the control electrode of the second transistor; a tunable current source (63) having a first terminal coupled to the second current electrode of the second transistor, a control terminal, and a second terminal coupled to a second power supply voltage terminal.

L. The voltage regulator of clause K, wherein the high power control circuit (34) further comprises: a first current source (82) having a first terminal coupled to the first power supply voltage terminal, and a second terminal; a third transistor (80) having a first current electrode coupled to the second terminal of the first current source, a control electrode, and a second current electrode; a second comparator (88) having a first input for receiving the first reference voltage, a second input for receiving a second feedback signal, and an output coupled to the control electrode of the third transistor; and a fourth transistor (78) having a first current electrode and a control electrode both coupled to the second current electrode of the third transistor and to the control terminal of the tunable current source, and a second current electrode coupled the second power supply voltage terminal.

M. The voltage regulator of clause J, wherein the low power control circuit (32) comprises: a third transistor (52) having a first current electrode coupled to the first terminal of the tunable resistance circuit, a control electrode, and a second current electrode; a third comparator (54) having a first input for receiving a reference voltage, a second input for receiving a feedback signal from the output driver current mirror circuit, and an output coupled to the control electrode of the third transistor; and a current source (56) having a first terminal coupled to the second current electrode of the third transistor, and a second terminal coupled to a second power supply voltage terminal.

N. The voltage regulator of clause J, wherein the output driver transistor (38) and the first transistor (36) are characterized as being a P-channel metal-oxide semiconductor transistors.

O. The voltage regulator of clause J, wherein the voltage regulator is implemented on a single integrated circuit and the output terminal is for providing an output voltage of the voltage regulator to a circuit external to the integrated circuit.

P. The voltage regulator of clause J, wherein the tunable resistance circuit (40) provides a variable resistance in response to a resistance control signal, wherein the tunable resistance circuit provides di/dt control of an output voltage at the output terminal (26).

The invention claimed is:

1. A voltage regulator comprising:
   an output terminal;
   an output driver current mirror circuit comprising:
   an output driver transistor having a first current electrode coupled to a first power supply voltage terminal, a control electrode, and a second current electrode coupled to the output terminal;
   a tunable resistance circuit having a first terminal, a control terminal, and a second terminal coupled to the control electrode of the output driver transistor; and
   a first transistor having a first current electrode coupled to the first power supply voltage terminal, a control electrode and a second current electrode both coupled to the first terminal of the tunable resistance circuit;
   a high power control circuit coupled to the first terminal of the tunable resistance circuit for providing a first current to the output driver current mirror circuit in a first operating mode; and
   a low power control circuit coupled to the first terminal of the tunable resistance circuit for providing a second current to the output driver current mirror circuit in a second operating mode, the second current being smaller than the first current.

2. The voltage regulator of claim 1, wherein the high power control circuit comprises:
   a second transistor having a first current electrode coupled to the first terminal of the tunable resistance circuit, a control electrode, and a second current electrode;
   a first comparator having a first input for receiving a first reference voltage, a second input for receiving a first feedback signal from the output driver current mirror circuit, and an output coupled to the control electrode of the second transistor;
   a tunable current source having a first terminal coupled to the second current electrode of the second transistor, a control terminal, and a second terminal coupled to a second power supply voltage terminal.

3. The voltage regulator of claim 2, wherein the high power control circuit further comprises:
   a first current source having a first terminal coupled to the first power supply voltage terminal, and a second terminal;
   a third transistor having a first current electrode coupled to the second terminal of the first current source, a control electrode, and a second current electrode;
   a second comparator having a first input for receiving the first reference voltage, a second input for receiving a second feedback signal, and an output coupled to the control electrode of the third transistor; and
   a fourth transistor having a first current electrode and a control electrode both coupled to the second current electrode of the third transistor and to the control terminal of the tunable current source, and a second current electrode coupled the second power supply voltage terminal.

4. The voltage regulator of claim 1, wherein the low power control circuit comprises:
   a third transistor having a first current electrode coupled to the first terminal of the tunable resistance circuit, a control electrode, and a second current electrode;
   a third comparator having a first input for receiving a reference voltage, a second input for receiving a feedback signal from the output driver current mirror circuit, and an output coupled to the control electrode of the third transistor; and
   a current source having a first terminal coupled to the second current electrode of the third transistor, and a second terminal coupled to a second power supply voltage terminal.

5. The voltage regulator of claim 1, wherein the output driver transistor and the first transistor are characterized as being P-channel metal-oxide semiconductor transistors.

6. The voltage regulator of claim 1, wherein the voltage regulator is implemented on a single integrated circuit and the output terminal is for providing an output voltage of the voltage regulator to a circuit external to the integrated circuit.

7. The voltage regulator of claim 1, wherein the tunable resistance circuit provides a variable resistance in response to a resistance control signal, wherein the tunable resistance circuit provides di/dt control of an output voltage at the output terminal.

8. A method of regulating a voltage by a voltage regulator comprising:
   an output terminal;
   an output driver current mirror circuit comprising an output driver transistor and a diode-connected transistor with a tunable resistance circuit coupled therebetween; and a first control circuit being a low power control circuit and comprising a first comparator,
   the method comprising:
   providing, by the output driver transistor, an output voltage to the output terminal;
   controlling, by the first comparator, a first current to the output driver current mirror circuit in response to a first feedback signal from the output terminal;
   controlling, by a second comparator comprised in a second control circuit being a high power control circuit, a second current to the output driver current mirror circuit in response to a second feedback signal from the output terminal; and
   providing by the tunable resistance circuit, a variable resistance to control an electrode of the output driver transistor in response to a control signal, thereby providing di/dt control for the output voltage.

9. The method of claim 8, further comprising, in response to a third feedback signal indicating that the output voltage at the output terminal is below a predetermined voltage level, increasing the second current to the output driver current mirror circuit, by means of a third comparator comprised in the second control circuit.

10. A voltage regulator comprising:
    an output terminal;
    an output driver current mirror circuit comprising an output driver transistor and a diode-connected transistor with a tunable resistance circuit coupled therebetween, the output driver transistor coupled to provide an output voltage to the output terminal; and
    a first control circuit comprising a first comparator, the first comparator for controlling a first current to the output driver current mirror circuit in response to a first feedback signal from the output terminal.

11. The voltage regulator of claim 10, further comprising:
    a second control circuit comprising a second comparator, the second comparator for controlling a second current to the output driver current mirror circuit in response to a second feedback signal from the output terminal.

12. The voltage regulator of claim 11, wherein the second control circuit comprising a third comparator coupled to increase the second current to the output driver current mirror circuit in response to a third feedback signal indicating that the output voltage at the output terminal is below a predetermined voltage level.

13. The voltage regulator of claim 10, wherein the tunable resistance circuit provides a variable resistance to a control electrode of the output driver transistor in response to a control signal, and wherein the variable resistance provides di/dt control for the output voltage.

14. The voltage regulator of claim 10, wherein the voltage regulator is formed on an integrated circuit.

15. A voltage regulator comprising:
an output driver transistor having a first current electrode coupled to a first power supply voltage terminal, a control electrode, and a second current electrode coupled to an output terminal;
a tunable resistance having a first terminal coupled to the control terminal of the output driver transistor, a second terminal, and a control terminal for receiving a control signal;
a first transistor having a first current electrode coupled to the first power supply voltage terminal, a control electrode, and a second current electrode coupled to the second terminal of the tunable resistance;
a second transistor having a first current electrode coupled to the second current electrode of the first transistor, a control electrode, and a second current electrode; and
a first comparator having a first input for receiving a first reference voltage, a second input coupled to the output terminal for receiving a first feedback signal, and an output coupled to the control electrode of the second transistor.

16. The voltage regulator of claim 15, further comprising a tunable current source having a first terminal coupled to the second current electrode of the second transistor, a control terminal, and a second terminal coupled to a second power supply voltage terminal.

17. The voltage regulator of claim 16, further comprising:
a second comparator having a first input for receiving the first reference voltage, a second input coupled to the output terminal for receiving a second feedback signal, and an output;
a first current source having a first terminal coupled to the first power supply voltage terminal, and a second terminal;
a third transistor having a first current electrode coupled to the second terminal of the first current source, a control terminal coupled to the output of the second comparator, and a second current electrode; and
a fourth transistor having a first current electrode coupled to the second current electrode of the third transistor, a control electrode coupled to the control terminal of the tunable current source, and a second current electrode coupled to the second power supply voltage terminal.

18. The voltage regulator of claim 15, further comprising:
a fifth transistor having a first current electrode coupled to the second terminal of the tunable resistance circuit, a control electrode, and a second current electrode;
a third comparator having a first input for receiving a second reference voltage, a second input coupled to the output terminal for receiving a third feedback signal, and an output; and
a second current source having a first terminal coupled to the second current electrode of the fifth transistor, and a second terminal coupled to a second power supply voltage terminal.

19. The voltage regulator of claim 18, wherein the second current source is switchable between a high impedance state and a low impedance state.

20. The voltage regulator of claim 15, wherein the voltage regulator is implemented on a single integrated circuit.

* * * * *